(12) United States Patent
Choudhary

(10) Patent No.: US 6,782,404 B2
(45) Date of Patent: Aug. 24, 2004

(54) JITTER TOLERANCE IMPROVEMENT BY PHASE FILTRATION IN FEED-FOWARD DATA RECOVERY SYSTEMS

(75) Inventor: Vikas Choudhary, Burnaby (CA)

(73) Assignee: PMC-Sierra Ltd., Burnaby (CA)

( * ) Notice: Subject to any disclaimer, the term of this patent is extended or adjusted under 35 U.S.C. 154(b) by 610 days.

(21) Appl. No.: 09/891,518

(22) Filed: Jun. 27, 2001

(65) Prior Publication Data

US 2003/0055854 A1 Mar. 20, 2003

(51) Int. Cl.$^7$ .......................... G06F 17/10; G06F 17/17
(52) U.S. Cl. ........................................ 708/300; 708/313
(58) Field of Search ................................. 708/300, 307, 708/313; 341/141, 115; 375/293; 327/233

(56) References Cited

U.S. PATENT DOCUMENTS

| | | | | |
|---|---|---|---|---|
| 4,833,474 A | * | 5/1989 | Nagai et al. ................. | 341/166 |
| 5,825,825 A | * | 10/1998 | Altmann et al. ............ | 375/293 |
| 6,266,799 B1 | * | 7/2001 | Lee et al. ....................... | 716/6 |
| 6,556,249 B1 | * | 4/2003 | Taylor et al. ............... | 348/497 |
| 6,611,219 B1 | * | 8/2003 | Lee et al. .................... | 341/141 |

OTHER PUBLICATIONS

Chih–Kong Ken Yang et al, "A 0.5–μm CMOS 4.0–Gbit/s Serial Link Transceiver with Data Recovery Using Over sampling", IEEE Journal of Solid–State Circuits, vol. 33, No. 5, pp. 713–722 (May 1998).

* cited by examiner

*Primary Examiner*—Chuong Dinh Ngo
(74) *Attorney, Agent, or Firm*—Oyen Wiggs Green & Mutala

(57) ABSTRACT

Over-sampled timing signal jitter tolerance is improved in a q-times over-sampled architecture by phase-sampling the timing signal to produce a plurality of input phase samples $\phi_{in}$, where $\phi_{in} \in \{\phi_1, \phi_2, \ldots, \phi_q\}$. An output phase value $\phi_{out} = \phi_{in}$ is initialized for each input sample $\phi_{in}$. A difference vector $d_i$ is derived for each input sample $\phi_{in}$, where $d_i = F_j(n,k)$. F denotes a vector operation, n is the number of input samples, k is a pre-defined threshold value, and j represents a filter order value. A predefined scaling coefficient $a_i$ is applied to each difference vector $d_i$ to produce a corresponding set of scaled difference vectors $a_i d_i$. The scaled difference vectors are summed:

$$d_j = \sum_{i=1}^{n} a_i d_i.$$

The output value $\phi_{out}$ is incremented by 1 if $d_j > k$; decremented by 1 if $d_j < -k$; and maintained unchanged if $-k \leq d_j \leq k$. Finally, the output value $\phi_{out}$ is selected to represent the input sample $\phi_{in}$.

9 Claims, 9 Drawing Sheets

JITTER TOLERANCE IMPROVEMENT BY PHASE FILTRATION IN FEED-FOWARD DATA RECOVERY SYSTEMS

TECHNICAL FIELD

This invention pertains to adaptive and programmable improvement of jitter tolerance margins in feed-forward data recovery systems using statistical correlating digital phase-filtering techniques.

BACKGROUND

High speed digital communications networks require very accurate time synchronization throughout the network. This is accomplished by incorporating "clock-recovery" circuits in key network components such as add/drop multiplexers, digital cross-connects, regenerative repeaters, etc. Such circuits extract timing signals embedded in the transmitted data. The extracted timing signals are used to control sampling and retiming of the received data. However, noise can cause the period of a received data signal to fluctuate or "jitter". The extracted timing signals must remain in synchronization with the data, irrespective of jitter.

For purposes of this invention, a clock recovery circuit's "jitter tolerance" is representative of the maximum amount of jitter that can be imposed on a timing signal processed by the circuit without impairing the circuit's ability to produce a jitter-free replica of the timing signal. Typical clock recovery circuits have very high jitter tolerance (exceeding 1 Unit Internal (UI)) at lower jitter frequencies, but have significantly degraded jitter tolerance when processing signals having high frequency jitter content.

Prior art clock-recovery circuits are typically based on phase-locked loop (PLL) or surface acoustic wave (SAW) filters, with PLLs being more common in view of the high cost of SAWs. Analog PLLs, typically comprising a phase detector, voltage-controlled oscillator (VCO) and a low pass filter, are undesirable in spite of their highly accurate performance, due to their relative complexity, large power consumption and large integrated circuit surface area requirements.

Digital data recovery systems, such as feed-forward over-sampled architectures have been developed to reduce the large power consumption and integrated circuit surface area requirements of analog systems. Prior art over-sampled architectures can perform very high speed phase detection with good low frequency jitter margins. However, such architectures are subject to significant degradation of jitter tolerance if subjected to high frequency jitter and low transition data.

More particularly, high speed phase tracking at very high frequencies is susceptible to unwanted tracking of uncorrelated high frequency noise components such as duty-cycle distortion, pattern dependent jitter (also known as inter-symbol interference or ISI), high frequency noise on data over-sampling clock phases (resulting in abrupt movement of the reference phases) or glitchy transition detection (due mostly to metastability problems in the front-end samplers). Most such noise components bear no correlation to the relatively lower frequency deterministic component of noise or phase change.

Prior art systems which are incapable of distinguishing between such high frequency uncorrelated noises and their lower frequency deterministic counterparts are error prone. The jitter tolerance of such systems is reduced well below the theoretical maximum of (1-phase quantization step) UI peak-to-peak, to a theoretical minimum of (phase quantization step—non-idealities) UI peak-to-peak. phase quantization step (or phase quantization noise) is the minimum phase step which cannot be further broken down and distinguished by the system. In a q-times over-sampled architecture, the phase quantization step is $q^{-1}$ UI peak-to-peak. non-idealities (which tend to further reduce jitter tolerance) include factors such as input offset at the data sampler's front end, duty cycle distortion on the data, etc.

FIGS. 1, 2 and 3 illustrate the prior art's significant degradation of jitter tolerance at high speed. FIG. 1 depicts a conventional feed-forward over-sampled data recovery scheme with a four-bit segment of an ideal, jitter-free data signal 10 representing the bit pattern "1010". Each four-bit segment is 5-times over-sampled (i.e. q=5), reducing the data rate required in the subsequent pipelined processing circuitry by a factor of four, with the five sampling clock phases 12 (i.e. $\phi 2$, $\phi 3$, $\phi 4$, $\phi 5$) ideally being equally spaced apart by 0.2 UI over the four bit segment. FIG. 3 is a phase-circle diagram depicting a 1 UI bit period divided into five phase periods $\phi 1$, $\phi 2$, $\phi 3$, $\phi 4$, $\phi 5$ arranged in a circle, with bit boundary 31 shown, by way of example only, between $\phi 1$ and $\phi 5$. Each phase period corresponds to 0.2 UI, as noted above.

Returning to FIG. 1, "bit 1" is sampled five times at sampling clock phases $\phi 1_1$, $\phi 2_1$, $\phi 3_1$, $\phi 4_1$, and $\phi 5_1$; "bit 2" is sampled five times at sampling clock phases $\phi 1_2$, $\phi 2_2$, $\phi 3_2$, $\phi 4_2$, and $\phi 5_2$; "bit 3" is sampled five times at sampling clock phases $\phi 1_3$, $\phi 2_3$, $\phi 3_3$, $\phi 4_3$, and $\phi 5_3$; and, "bit 4" is sampled five times at sampling clock phases $\phi 1_4$, $\phi 2_4$, $\phi 3_4$, $\phi 4_4$, and $\phi 5_4$. The twenty resultant over-sampled bits are exclusive-or'd, in adjacent pairs, by one of twenty exclusive-or gates 14 to produce, at outputs 16, twenty binary signals representative of the 0-to-1 and 1-to-0 bit transitions in signal 10. For example, the leftmost exclusive-or gate shown in FIG. 1 produces a "1" output signal representative of the 0-to-1 bit transition in the trailing edge portion of bit 1 during sampling clock phase $\phi 1_1$, etc.

The corresponding phase portions of bit transition output signals 16 are summed to produce a weighted sum for each of the five phases implicit in the aforementioned 5-times over-sampling of signal 10. Specifically, combiner 18 produces an output signal $\phi_1$sum representative of the sum of the $1^{st}$ phase over-sampled portions $\phi 1_1$, $\phi 1_2$, $\phi 1_3$, $\phi 1_4$ of bits 1, 2, 3 and 4 respectively; combiner 20 produces an output signal $\phi_2$sum representative of the $2^{nd}$ phase over-sampled portions $\phi 2_1$, $\phi 2_2$, $\phi 2_3$, $\phi 2_4$; combiner 22 produces an output signal $\phi_3$sum representative of the $3^{rd}$ phase over-sampled portions $\phi 3_1$, $\phi 3_2$, $\phi 3_3$, $\phi 3_4$; combiner 24 produces an output signal $\phi_4$sum representative of the $4^{th}$ phase over-sampled portions $\phi 4_1$, $\phi 4_2$, $\phi 4_3$, $\phi 4_4$; and, combiner 26 produces an output signal $\phi_5$sum representative of the $5^{th}$ phase over-sampled portions $\phi 5_1$, $\phi 5_2$, $\phi 5_3$, $\phi 5_4$.

The five weighted summation signals $\phi_1$sum, $\phi_2$sum, $\phi_3$sum, $\phi_4$sum and $\phi_5$sum are input to 5-way comparator 28 which determines the summation signal having the greatest weight and outputs a signal representative thereof to data selector 30. As FIG. 1 clearly shows, in the absence of jitter on signal 10, combiner 18 receives four "1" input signals, whereas each of combiners 20, 22, 24 and 26 receive four "0" input signals. Accordingly, the summation signal $\phi_1$sum produced by combiner 18 clearly outweighs the summation signals produced by any one of combiners 20, 22, 24 and 26. Consequently, 5-way comparator 28 correctly outputs to data selector 30 a signal representative of the fact that the 0-to-1 and 1-to-0 bit transitions in signal 10 occur during the 1$^{st}$ phase (i.e. φ1) over-sampled portions φ1$_1$, φ1$_2$, φ1$_3$, φ1$_4$, of bits 1, 2, 3 and 4 respectively, thereby facilitating accurate recovery of signal 10 by subsequent processing circuitry (not shown). If 5-way comparator 28 determines that two phases have equally high weighting, it invokes an arbitration scheme to select one of those two phases.

Now consider FIG. 2, which is identical to FIG. 1 except that a jittered version 10A of data signal 10 is to be recovered. In this case, combiner 18 receives four "0" input signals; combiner 20 receives three "0" input signals and one "1" input signal; combiner 22 receives three "0" input signals and one "1" input signal; combiner 24 receives two "0" input signals and two "1" input signals; and, combiner 26 receives four "0" input signals. Consequently, 5-way comparator 28 incorrectly outputs to data selector 30 a signal indicating that the 0-to-1 and 1-to-0 bit transitions in signal 10 occur during the 4$^{th}$ phase (i.e. φ4) over-sampled portions φ4$_1$, φ4$_2$, φ4$_3$, φ4$_4$ of bits 1, 2, 3 and 4 respectively, resulting in inaccurate recovery of signal 10 by data selector 30.

This invention utilizes a digital phase filter which accumulates phase transition statistics, discriminating between correlated (i.e. deterministic) and uncorrelated phase noise to facilitate filtration (i.e. suppression or rejection) of uncorrelated phase noise, thereby improving jitter tolerance and in turn improving the data recovery capability. Unlike prior art feed-forward data recovery systems, the invention achieves high jitter tolerance notwithstanding large amounts of high frequency noise and low transition density data patterns. The invention is capable of jitter tolerance close to the theoretically attainable limit (i.e. comparable to the performance of analog PLLs) but with significantly lower power consumption and reduced integrated circuit surface area.

SUMMARY OF INVENTION

The invention improves over-sampled timing signal jitter tolerance in a q-times over-sampled architecture. The over-sampled timing signal is phase-sampled to produce a plurality of input phase samples $\phi_{in}$, where $\phi_{in} \in \{\phi_1, \phi_2, \ldots, \phi_q\}$. An output phase value $\phi_{out} = \phi_{in}$ is initialized for each input phase sample $\phi_{in}$. A difference vector $d_i$ is then derived for each input phase sample $\phi_{in}$, where $d_i = F_j(n,k)$. F denotes a vector operation, n is the number of input phase samples, k is a pre-defined threshold value, and j represents a filter order value. A predefined scaling coefficient $a_i$ is applied to each difference vector $d_i$ to produce a corresponding set of scaled difference vectors $a_i d_i$. The scaled difference vectors are then summed:

$$d_j = \sum_{i=1}^{n} a_i d_i.$$

The output phase value $\phi_{out}$ is either incremented by 1 if $d_j > k$; or decremented by 1 if $d_j < -k$; and maintained unchanged if $-k \leq d_j \leq k$. Finally, the output phase value $\phi_{out}$ is selected to represent the input phase sample $\phi_{in}$.

In a first order filter embodiment of the invention, j=1 and $a_i$=1 for all i=1, . . . , n.

The vector operation F may comprise assigning a value 1 to the difference vector $d_i$ if $\phi_{in} > \phi_{out}$; assigning a value −1 to the difference vector $d_i$ if $\phi_{in} < \phi_{out}$; and, assigning a value 0 to the difference vector $d_i$ if $\phi_{in} = \phi_{out}$.

The parameters j, n and k may be varied (programmably or otherwise) to attain a desired jitter tolerance value. Adaptive performance can be attained by deriving a plurality$_N$ of difference vectors $d_{iN}$ for each input phase sample $\phi_{in}$, where $d_{iN} = F_{jN}(n_N, k_N)$, and combining selected ones of the difference vectors $d_{iN}$ to attain a desired jitter tolerance value.

Alternatively, adaptive performance can be attained by processing a selected number of the difference vectors to produce a jitter spectrum representative of statistically significant variation in the difference vectors, then varying j, n, k and $a_i$ as a function of the jitter spectrum to adaptively attain a desired jitter tolerance value. Jitter tolerance can be further improved by monitoring the bit error rate of the output phase value $\phi_{out}$, and, increasing the number of the difference vectors used to produce the jitter spectrum if the bit error rate exceeds a pre-defined value.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
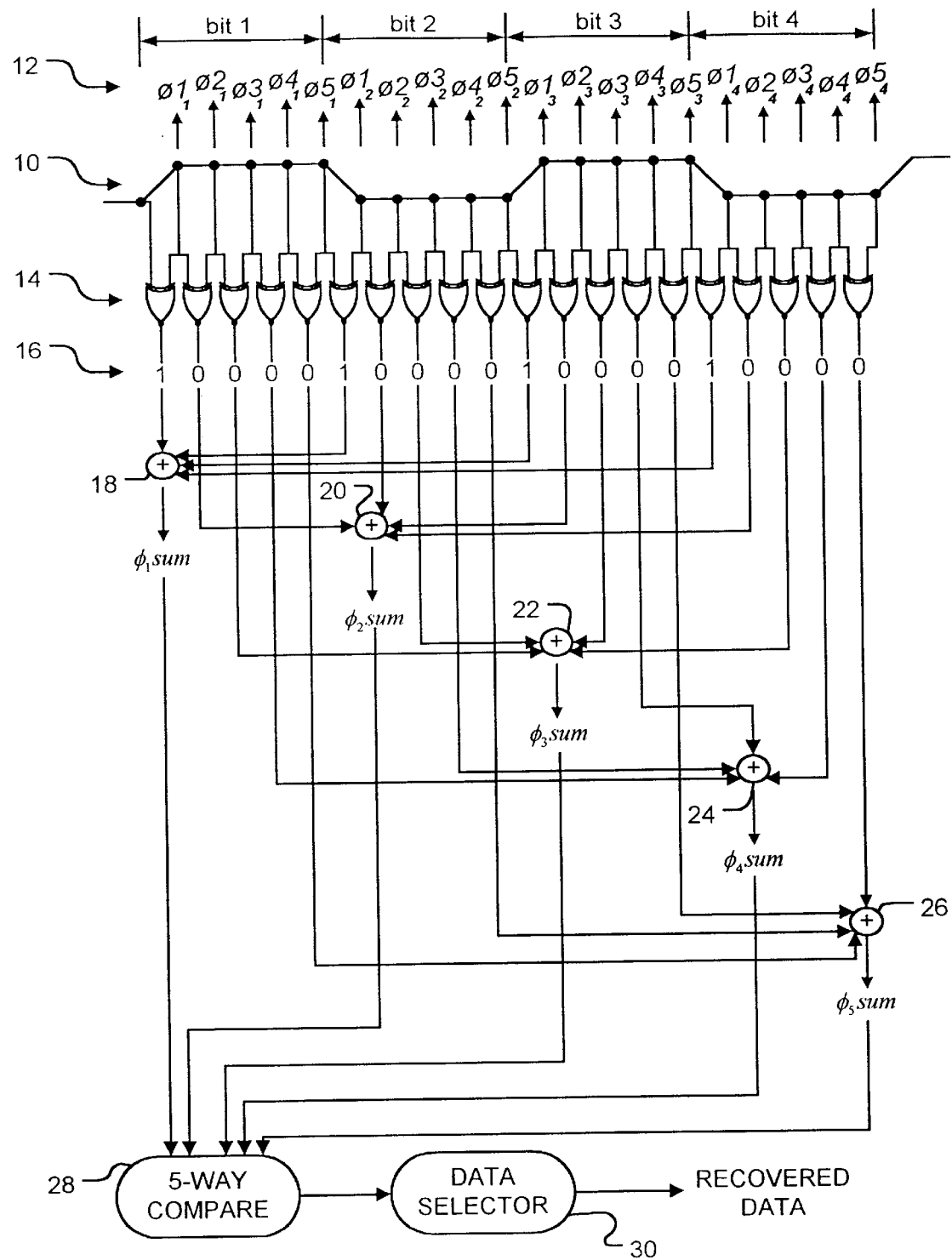
FIG. 1 depicts a prior art feed-forward over-sampled technique for recovering the phase of a data signal, and illustrates operation in the case of a jitter-free data signal.
Figure 2:
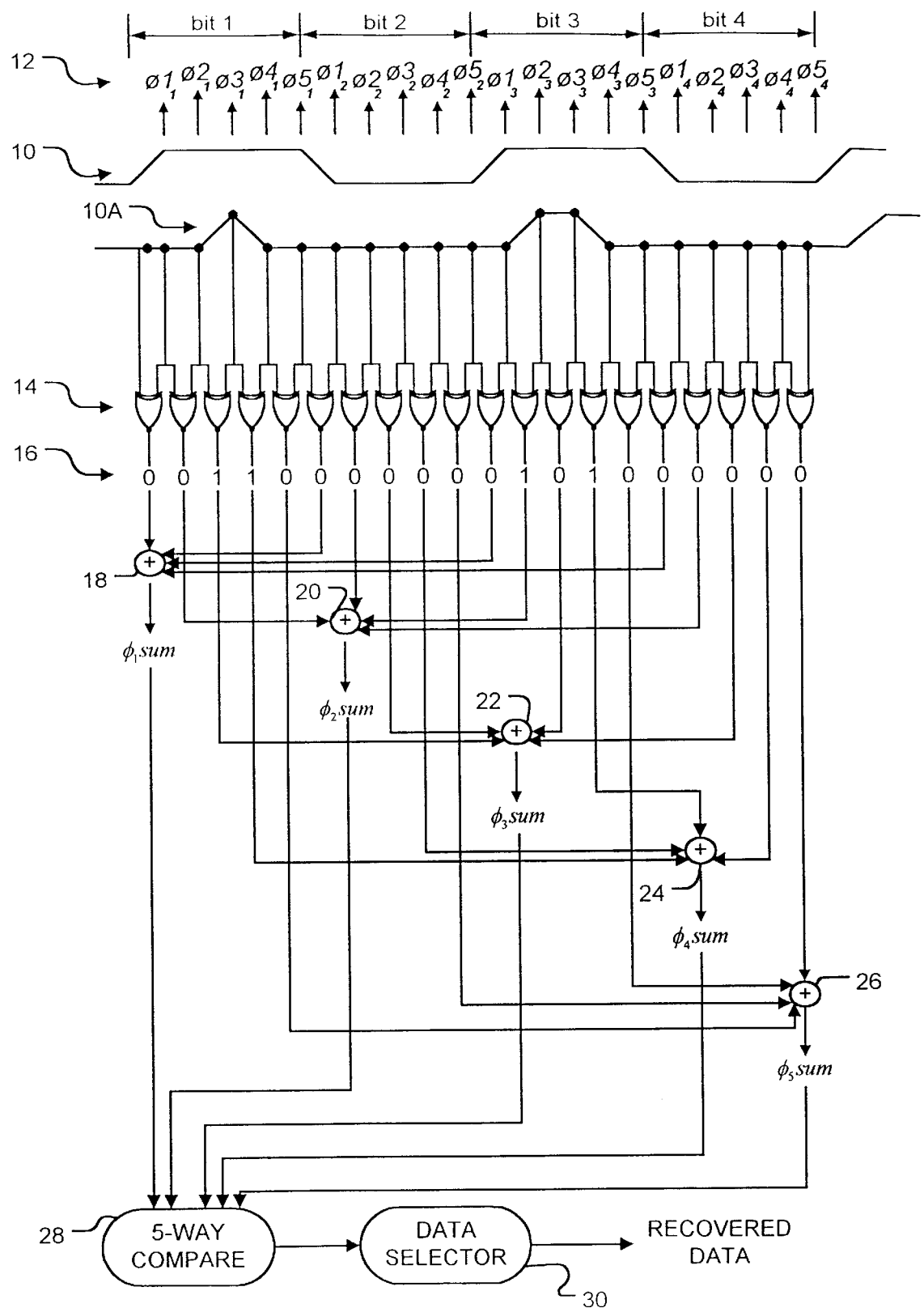
FIG. 2 is similar to FIG. 1, but illustrates operation in the case of a jittered data signal.
Figure 4:
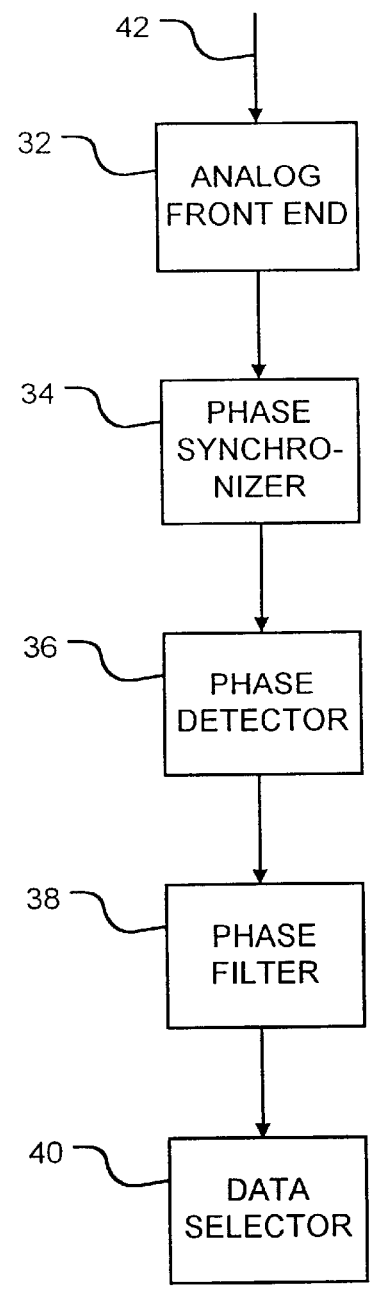
FIG. 4 is a block diagram representation of an over-sampled data recovery system incorporating digital phase filtration in accordance with the invention.

FIG. 4 depicts an over-sampled data recovery system in accordance with the invention and incorporating analog front end 32, analog phase synchronizer 34, digital phase detector 36, digital phase filter 38, and digital data selector 40. Analog front end 32 5-times over-samples analog input data signal 42, four bits at a time, and converts the analog data to digital form consisting of twenty over-sampled bits, as described above. Phase synchronizer 34 resynchronizes the over-sampled bits output by front end 32 on twenty clock phases to a single clock domain. Digital phase detector 36 examines the resynchronized over-sampled bits to locate the 0-to-1 and 1-to-0 bit transition positions for each one of the five phases, and determines the phase having the highest weighting, as previously explained with reference to FIGS. 1 and 2.

The mathematical operation denoted $F_j(n,k)$ represents digital phase-filtration in accordance with the invention. Such digital filtration (also referred to as "$F_j(n,k)$ filtering") operates on a finite set of samples, as opposed to operating on a continuous signal, as in analog domain filtration. n is the number of input samples processed, k is a threshold limit, and j represents the order of the filter. To draw a parallel between analog filtration and digital filtration in accordance with the invention, n is analogous to the filter's input spectrum, k is analogous to the filter's bandwidth (k<n), and j is analogous to the order of the filter—which determines the filter's cut-off sharpness.

To perform $F_j(n,k)$ filtering, difference vectors denoted do, where $i \leq n$, are accumulated over consecutive samples input to the filter, as follows:

| n (# of cycles) | $\phi_{in}$ (input to filter) | $\phi_{out}$ (selected output of filter) | $d_i$ (difference vector) |
|---|---|---|---|
| 1 | $\phi_1$ | $\phi_5$ | $d_i = F[\phi_{out}, \phi_{in}]$ |
| 2 | $\phi_3$ | $\phi_5$ | ... |
| ... | ... | ... | ... |
| n | $\phi_1$ | $\phi_5$ | $d_n = F[\phi_{out}, \phi_{in}]$ |

Figure 3:
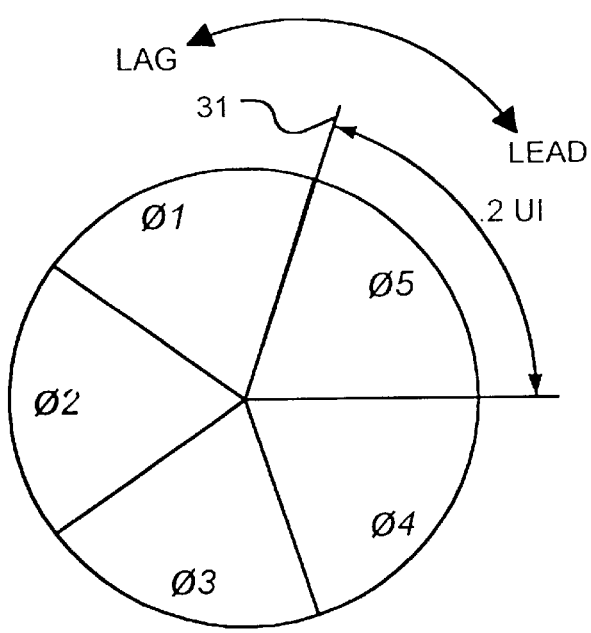
FIG. 3 is a phase circle diagram illustrating the theoretical jitter tolerance limitations of the FIG. 1 technique.

In a 5-times over-sampled embodiment of the invention (i.e. q=5), $\phi_{in} \in \{\phi_1, \phi_2, \phi_3, \phi_4, \phi_5\}$, reflecting the fact that the input is a finite set of samples, namely $\phi_1, \phi_2, \phi_3, \phi_4$, or $\phi_5$, as shown in FIG. 3. $\phi_{out}$ is the selected filter output, which has the same set of possible output values as $\phi_{in}$. Accordingly, $\phi_{out} \in \{\phi_1, \phi_2, \phi_3, \phi_4, \phi_5\}$, if q=5.

"F" is a vector operator applied to the input and output samples. One possible example of a simple first order "F" operation is that effected by a 3-level digital comparator which performs as follows:

if $\phi_{out} > \phi_{in}$ then $F[\phi_{out}, \phi_{in}] = 1$
  else if $\phi_{out} < \phi_{in}$ then $F[\phi_{out}, \phi_{in}] = -1$
    else $F[\phi_{out}, \phi_{in}] = 0$ More complex multi-level "F" operations can be defined, depending upon the degree of hardware complexity permitted by the particular system.

A "difference vector sum"

$$d_j = \sum_{i=1}^{n} a_i d_i$$

is derived, where $d_i$ is the vector corresponding to each $i^{th}$ cycle respectively, as tabulated above, and $a_i$ are predefined scaling coefficients. The numerical value of the resultant difference vector $d_j$ is compared with the value of a pre-defined threshold value k.

If $d_j > k$, then the filter's output is updated to coincide with the next possible value derived from the finite set of possible output values. For example, if $d_j > k$, then $\phi_{out} = \phi_{out+1}$ where $\phi_{out} \in \{1, 2, 3, 4, 5\}$. As previously explained with reference to FIG. 3, if $\phi_{out} = 5$ then $\phi_{out+1} = 1$ in a 5-times over-sampled embodiment of the invention (i.e. q=5). Similarly, if $d_j < k$, then $\phi_{out} = \phi_{out-1}$; and, if $\phi_{out} = 1$ then $\phi_{out1} = 5$ in a 5-times over-sampled embodiment of the invention. If $d_j = k$ then $\phi_{out} = \phi_{out}$.

Figure 5:
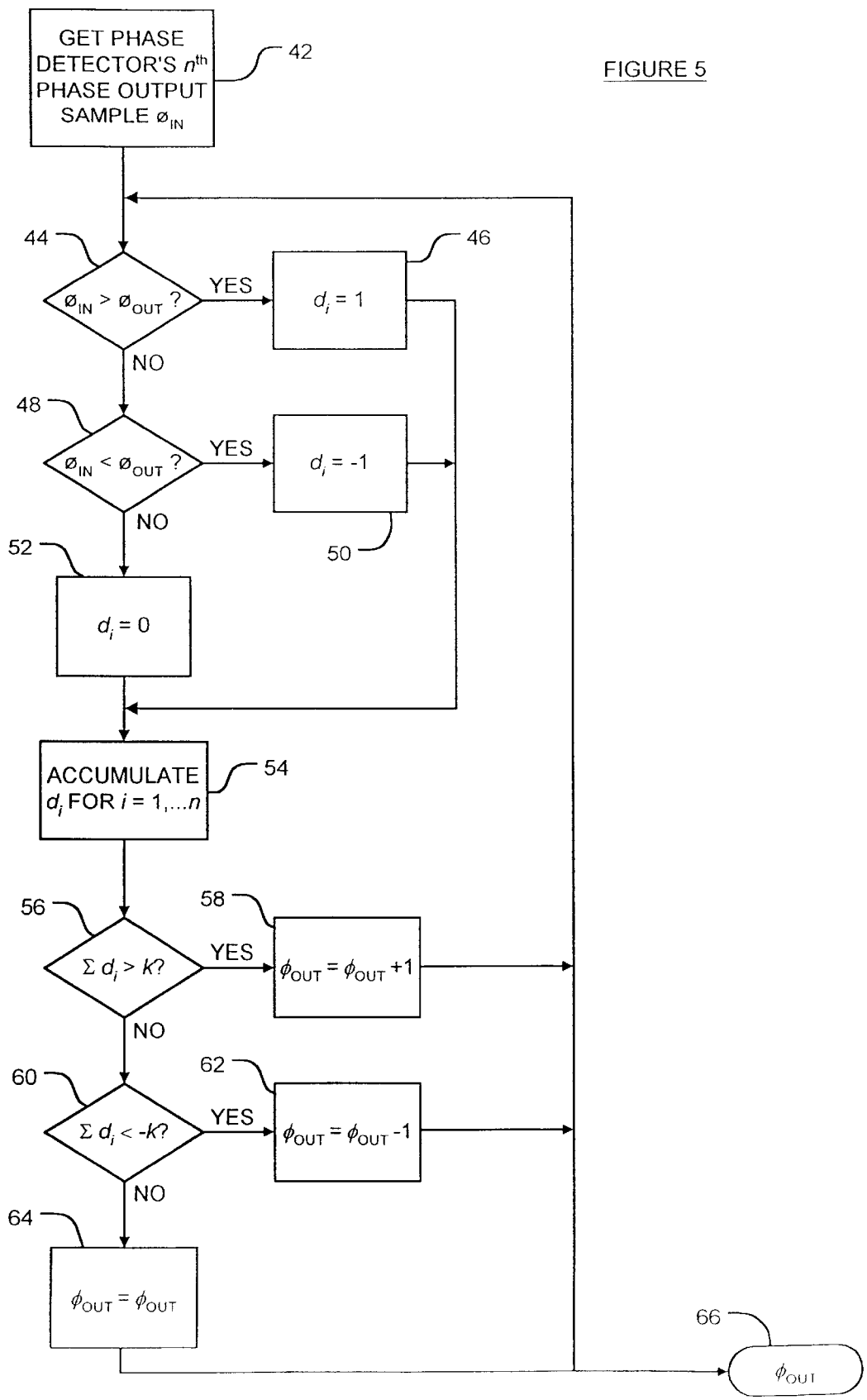
FIG. 5 is a flowchart representation of a first order phase filter embodying the invention.

In the context of the invention, a "first order" filter is one in which the operator "F" used to calculate each difference vector $d_i$ corresponds to a three-level digital comparator (as in the above example) and all of the scaling coefficients $a_i = 1$. This represents the simplest embodiment of the invention and is accordingly termed "first order". FIG. 5 is a flowchart representation of a three-level digital comparator first order filter in accordance with the invention. Difference vectors $d_i$ are assigned values of 1, −1 or 0 in blocks 46, 50, 52 respectively based on a comparison (blocks 44, 48) of the relative values of $\phi_{out}$ and $\phi_{in}$, as explained above. In a first order filter the scaling coefficients $a_i$ each have unity value (i.e. 1) and therefore need not be shown in FIG. 5. The difference vectors $d_i$ are summed (block 54) over all values of i=1, . . . n. If the resultant sum exceeds the predefined threshold value k (block 56) then the output phase value is incremented by 1 (block 58), care being taken to wrap the phase value back to "1" if the current phase value is the maximum phase value for the architecture embodying the invention. If the resultant sum is less than the pre-defined threshold value −k (block 60) then the output phase value is decremented by 1 (block 62), care being taken to wrap the phase value back to the maximum phase value for the architecture embodying the invention if the current phase value is "1". If the resultant sum is equal to either of the pre-defined threshold values −k, k or lies between them (i.e. $-k \leq \Sigma d_i \leq k$), then the output phase value remains unchanged (block 64). The output phase value produced via the appropriate one of blocks 58, 62, 64 is output as indicated at block 66, and processing continues at block 44 with the next set of input samples.

"Second", "third", and other higher order filters can be defined in various ways. For example, one may define a "second" order filter as one in which the "F" operation used to calculate each difference vector $d_i$ is more complex than the "greater than", "less than", "equal to" comparison operations effected by the above-described first order filter. Thus, a "second" order filter might determine the magnitude of the difference between $\phi_{out}$ and $\phi_{in}$, for example producing one of five possible output values $\{-1, -0.5, 0, 0.5, 1\}$ in a 5-times over-sampled system, thereby corresponding to a 5-level digital comparator. A "third" order filter might correspond to a 5-level digital comparator type second order filter having scaling coefficients $a_i \neq 1$.

Figure 6:
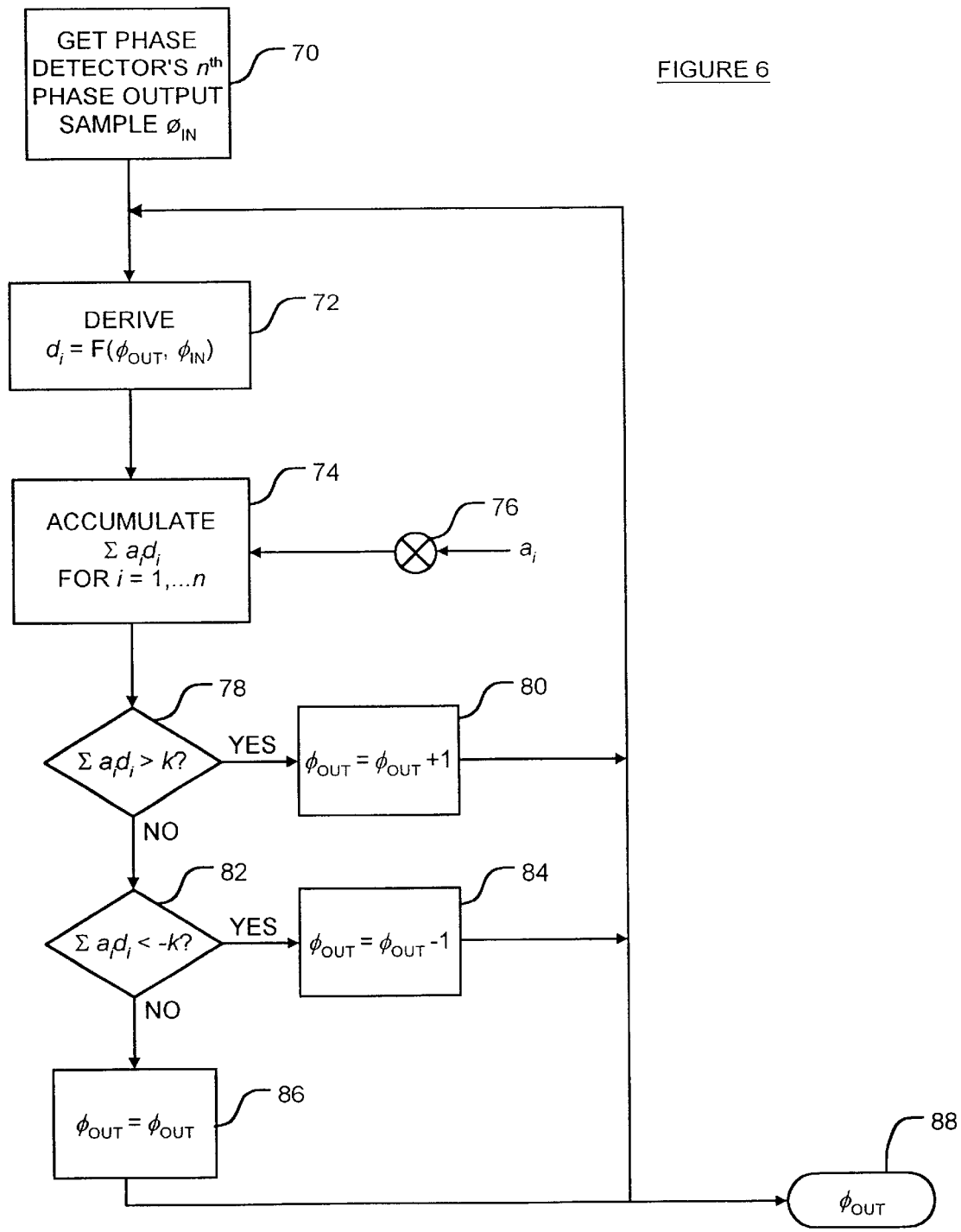
FIG. 6 is a flowchart representation of a generalized phase filter embodying the invention.

FIG. 6 is a flowchart representation of a generalized higher order digital filter in accordance with the invention. Difference vectors $d_i$ are assigned values $F[\phi_{out}, \phi_{in}]$ (block 72) in a accordance with a $F_j(n,k)$ filtering operation embodying selected values of n, k and j, as aforesaid. The difference vectors $d_i$ are combined with scaling coefficients $a_i$ (block 76) and summed (block 74) over all values of i=1, . . . n. If the resultant scaled sum exceeds the pre-defined threshold value k (block 78) then the output phase value is incremented by 1 (block 80), care being taken to wrap the phase value back to "1" if the current phase value is the maximum phase value for the architecture embodying the invention. If the resultant scaled sum is less than the pre-defined threshold value −k (block 82) then the output phase value is decremented by 1 (block 84), care being taken to wrap the phase value back to the maximum phase value for the architecture embodying the invention if the current phase value is "1". If the resultant scaled sum is equal to either of the pre-defined threshold values −k, k or lies between them (i.e. $-k \leq \Sigma a_i d_i \leq k$), then the output phase value remains unchanged (block 86). The output phase value produced via the appropriate one of blocks 80, 84, 86 is output as indicated at block 88, and processing continues at block 72 with the next input sample.

The predefined values selected for scaling coefficients $a_i$ are highly empirical and depend heavily on input data traffic patterns. There is accordingly no universally acceptable method of predefining the values of scaling coefficients $a_i$. A useful guideline is that if the value of i is closer to the value of n than to 0, then the value of $a_i$ should be less than the value selected for $a_i$ when i is closer to 0 (i.e. $a_i$ decreases as i approaches n). This is because as time progresses, input samples from the nth sample are less co-related to the output. Any desired combination of different order filters can be used to further enhance performance.

The invention facilitates very accurate weaning of low frequency content (the desired output) from high frequency content (i.e. unco-related noise such as ISI, duty cycle distortion, etc.) thus significantly improving jitter tolerance. This can be achieved with lower power consumption and lower integrated circuit surface area requirements than the prior art. $F_j(n,k)$ filtering in accordance with the invention also imparts a virtual memory effect, which improves jitter tolerance of low input transition density timing signals. As long as the input data's phase changes remain within the filter's tracking bandwidth, absence of 0-to-1 and 1-to-0 bit transitions does not degrade the filter's jitter tolerance.

In many cases, it will be useful to perform a sequential series of filter operations to yield a first order approximation with any desired degree of higher order fine tuning applied thereto, as follows: $[f_1F_1(n_1,k_1)+f_2F_2(n_2,k_2)+f_3F_3(n_3,k_3)+ \ldots +f_tF_t(n_t,k_t)]$. Thus, the output decision simulates a "t" order filter, providing very accurate correlation statistics of the jitter or random signal overriding the original set of samples. Consequently, the invention can attain very accurate high-frequency jitter tolerance coupled with optimal low frequency jitter.

Figure 7:
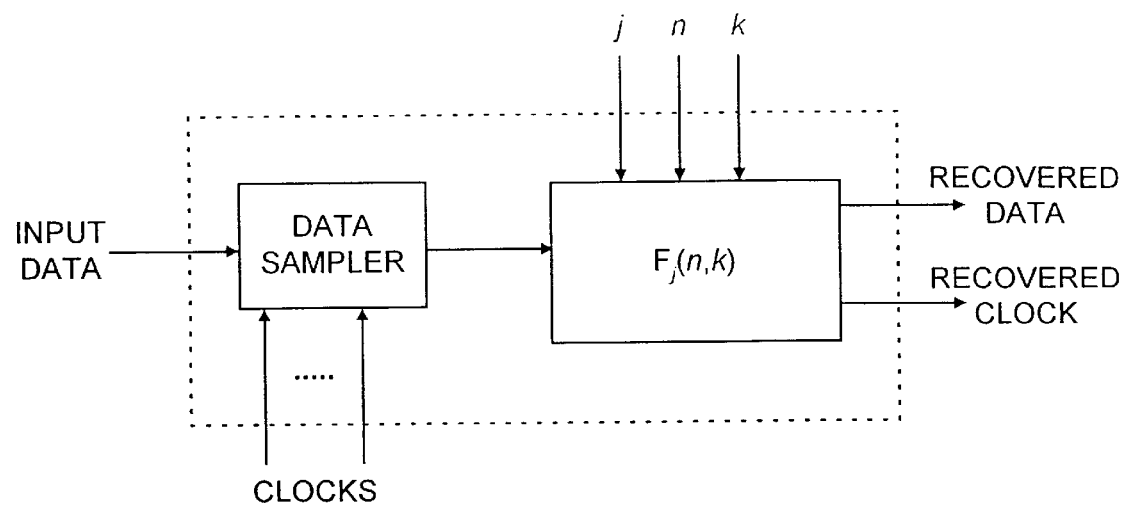
FIG. 7 is a schematic block diagram depiction of a filter for programmably controlling jitter tolerance in accordance with the invention.
Figure 8:
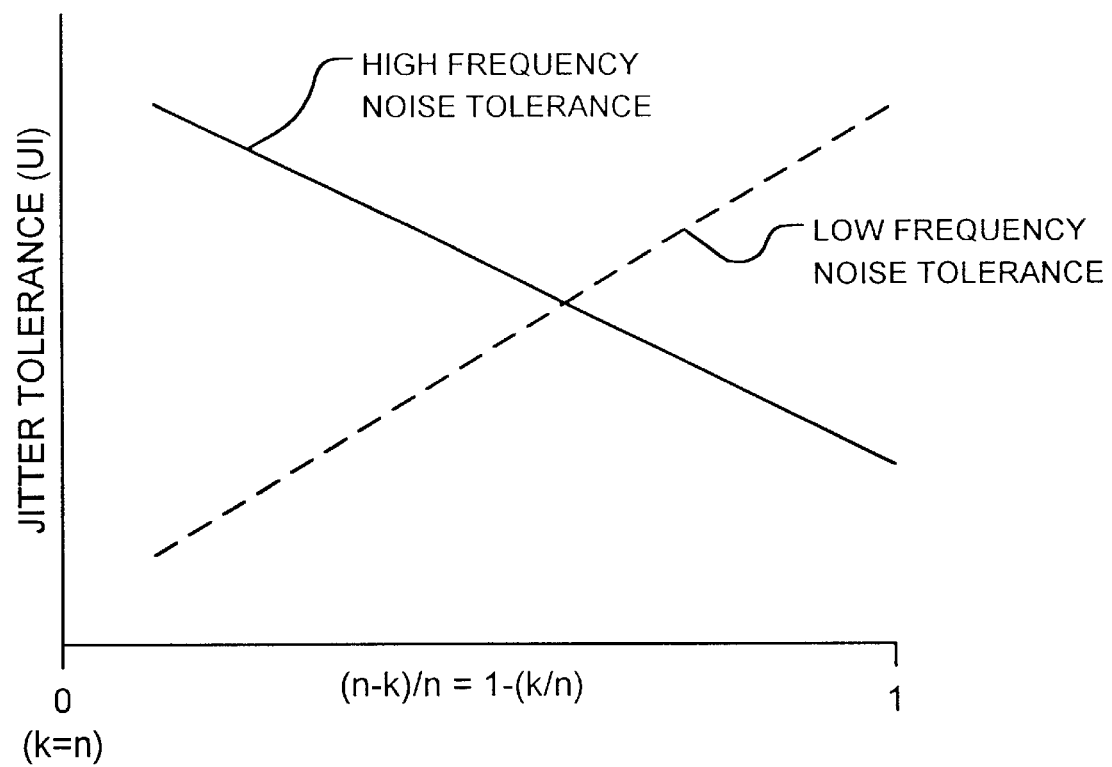
FIG. 8 graphically compares low and high frequency noise tolerance characteristics.

Mathematically, jitter tolerance is a complex function of the variables j, n, k, n–k, and the input data transition rate. By suitably selecting (i.e. "tuning") values of j, n and k, one may change the filter characteristics and select (or correlate) the output filtered phase from the jittered input phase in different ways. FIG. 7 depicts a jitter tolerant system which users can program by supplying appropriate values of j, n and k to cancel environmental or noise effects to which a specific system is subject. As shown in FIG. 8, as $$\frac{n-k}{n}$$

approaches zero, the system's high frequency noise tolerance improves, but its low frequency noise tolerance degrades. Conversely, as $$\frac{n-k}{n}$$

approaches unity, the system's low frequency noise tolerance improves, but its high frequency noise tolerance degrades. By selecting suitable values of j, n and k, one may programmably alter the characteristics of the FIG. 7 filter to attain any desired tradeoff of high vs. low frequency noise tolerance.

Figure 9:
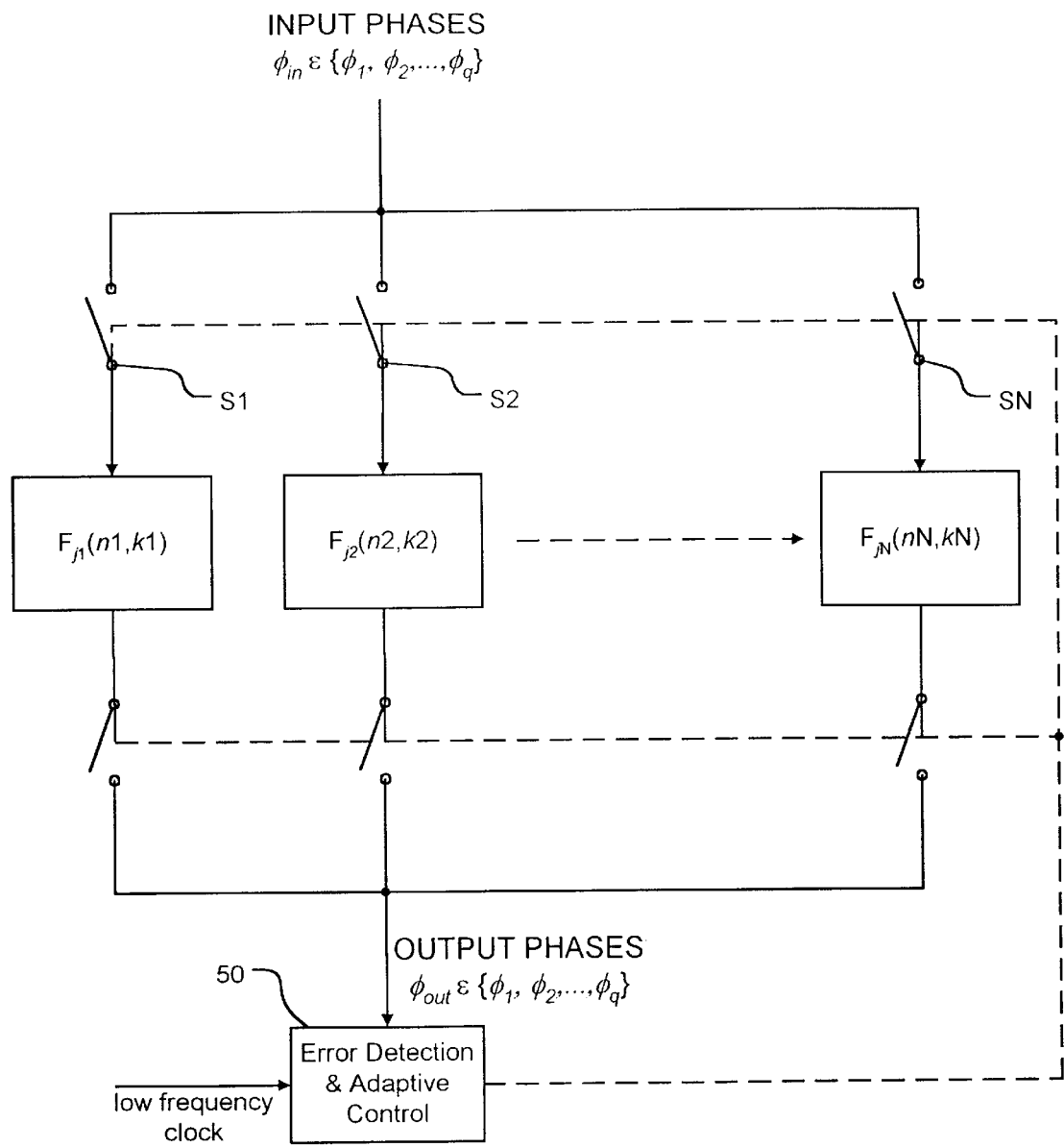
FIG. 9 is a schematic block diagram depiction of a filter for adaptively controlling jitter tolerance in accordance with the invention.

The generalized filter described above can be used to create an adaptive jitter tolerant system. A simple adaptive system can be used to switch between different filters within a bank of $F_j(n,k)$ filters. FIG. 9 shows one such adaptive filtering technique in which a bank of filters $F_{j1}(n_1,k_1)$, $F_{j2}(n_2,k_2), \ldots, F_{jN}(n_N,k_N)$ each having different values of n, k and j are selected in any desired combination via suitably programmed operation of gang switches $S_1, S_2, \ldots, S_N$ to control jitter tolerance. Error detector/adaptive controller 50 monitors the bit-error rate (BER) of the switch-selected filter combination; and, if the BER exceeds a predetermined threshold value, outputs control signals to switches $S_1$, $S_2, \ldots, S_N$ to adaptively reconfigure the filtration characteristic by selecting a different combination of filters. A low frequency system clock is used to count for long period of time. For example, at a data rate of 1.25 Gb/s, only 100 seconds are required to establish a BER of $10^{-12}$.

Alternatively, one may construct an improved adaptively controlled jitter tolerant system by monitoring statistically significant variations in the difference vectors $d_j$ output by the $F_j(n,k)$ filtering operation, to produce a "jitter spectrum" representative of noise power at different frequencies. The jitter spectrum can then be applied in a feedback loop to adaptively adjust the values of j, n, k, and $a_i$ as required to continuously attain improved jitter tolerance as operating conditions vary. This technique affords lower power consumption and lower integrated circuit surface area requirements than the FIG. 9 technique.

Figure 10:
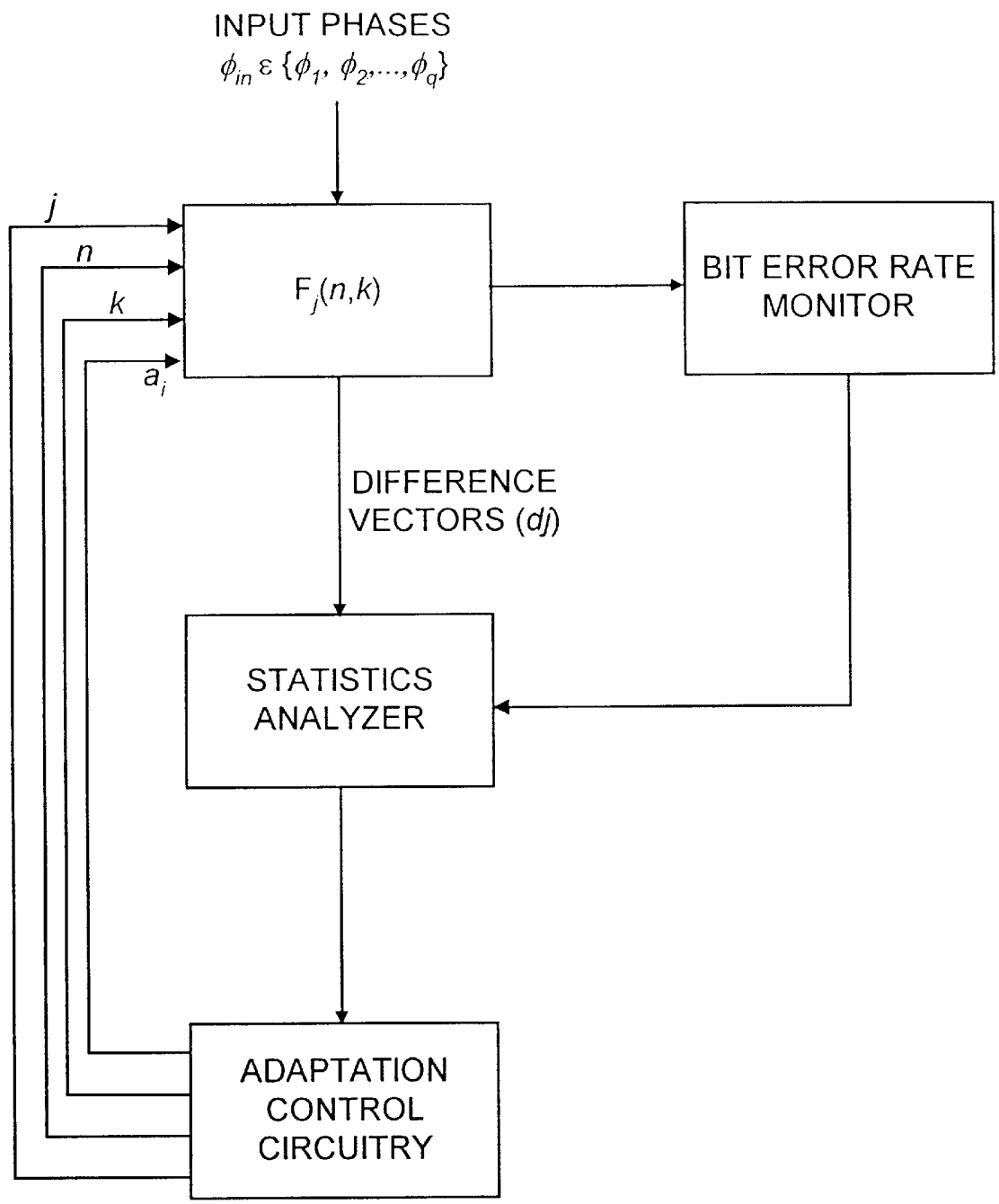
FIG. 10 is a schematic block diagram depiction of a filter for statistically adaptively controlling jitter tolerance in accordance with the invention.

FIG. 10 depicts such an improved adaptively controlled jitter tolerant system. After the FIG. 10 system has been initialized, the statistics analyzer monitors the difference vectors $d_j$ output by the $F_j(n,k)$ filter and produces a corresponding jitter spectrum. The jitter spectrum is input to the adaptation control circuitry which produces the j, n, k, and $a_i$ parameter values applied to the $F_j(n,k)$ filter. The adaptation control circuitry varies the j, n, k, and $a_1$ parameter values in accordance with the jitter spectrum to optimize the $F_j(n,k)$ filter's jitter tolerance. A bit error rate monitor is provided to monitor the system's overall performance. if performance degrades below a pre-defined threshold, the bit error rate monitor outputs to the statistics analyzer a signal to which the statistics analyzer responds by accumulating additional difference vector data before constructing the jitter spectrum.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of improving over-sampled timing signal jitter tolerance in a q-times over-sampled architecture, said method comprising:
   (a) phase sampling said over-sampled timing signal to produce a plurality of input phase samples $\phi_{in}$, where $\phi_{in} \in \{\phi_1, \phi_2, \ldots, \phi_q\}$;
   (b) for each one of said input phase samples $\phi_{in}$:
      (i) initializing an output phase value put $\phi_{out}=\phi_{in}$;
      (ii) deriving a difference vector $d_i$ for each one of said input phase samples $\phi_{in}$, where $d_i=F_j(n,k)$, F denotes a vector operation, n is the number of said input phase samples, k is a pre-defined threshold value, and j represents a filter order value;
      (iii) applying a predefined scaling coefficient $a_i$ to each one of said difference vectors $d_i$ to produce a scaled difference vector $a_i d_i$ corresponding to each one of said difference vectors;
      (iv) deriving a sum $$d_j = \sum_{i=1}^{n} a_i d_i$$

of said scaled difference vectors;
      (v) incrementing said output phase value $\phi_{out}$ by 1 if $d_j > k$;
      (vi) decrementing said output phase value $\phi_{out}$ by 1 if $d_j < -k$;

(vii) maintaining said output phase value $\phi_{out}$ unchanged if $-k \leq d_j \leq k$; and, (viii) selecting said output phase value $\phi_{out}$ to represent said input phase sample $\phi_{in}$.

2. A method as defined in claim 1, wherein j=1 and $a_i$=1 for all i=1, ..., n.

3. A method as defined in claim 2, wherein said vector operation F further comprises:

(a) assigning a value 1 to said difference vector $d_i$ if $\phi_{in} > \phi_{out}$;

(b) assigning a value −1 to said difference vector $d_i$ if $\phi_{in} < \phi_{out}$; and, (c) assigning a value 0 to said difference vector $d_i$ if $\phi_{in} = \phi_{out}$.

4. A method as defined in claim 1, further comprising varying j, n and k to attain a desired jitter tolerance value.

5. A method as defined in claim 1, further comprising programmably varying j, n and k to attain a desired jitter tolerance value.

6. A method as defined in claim 1, wherein said deriving said difference vector further comprises deriving a plurality $_N$ of said difference vectors $d_{iN}$ for each one of said input phase samples $\phi_{in}$, where $d_{iN} = F_{jN}(n_N, k_N)$.

7. A method as defined in claim 6, further comprising combining selected ones of said difference vectors $d_{iN}$ to attain a desired jitter tolerance value.

8. A method as defined in claim 1, further comprising:

(a) processing a selected number of said difference vectors to produce a jitter spectrum representative of statistically significant variation in said difference vectors; and, (b) varying j, n, k and $a_i$ as a function of said jitter spectrum to adaptively attain a desired jitter tolerance value.

9. A method as defined in claim 8, further comprising:

(a) monitoring the bit error rate of said output phase value $\phi_{out}$; and, (b) increasing said selected number of said difference vectors if said bit error rate exceeds a pre-defined value.

* * * * *